United States Patent
Heidan

(10) Patent No.: US 10,065,485 B2
(45) Date of Patent: Sep. 4, 2018

(54) SLIDING ROOF SYSTEM OF AN AUTOMOTIVE VEHICLE AND GUIDING RAIL PROFILE THEREFOR

(71) Applicant: Michael Heidan, Stuttgart (DE)

(72) Inventor: Michael Heidan, Stuttgart (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 15/660,041

(22) Filed: Jul. 26, 2017

(65) Prior Publication Data
US 2018/0029453 A1 Feb. 1, 2018

(30) Foreign Application Priority Data
Jul. 27, 2016 (DE) .................. 10 2016 213 823

(51) Int. Cl.
*B60J 7/02* (2006.01)
*B60J 7/00* (2006.01)
*B60J 7/04* (2006.01)

(52) U.S. Cl.
CPC ............. *B60J 7/0084* (2013.01); *B60J 7/04* (2013.01)

(58) Field of Classification Search
CPC ......... B60J 7/0084; B60J 7/022; B60J 7/0435
USPC ................................ 296/213, 216.06–216.08
See application file for complete search history.

(56) References Cited

U.S. PATENT DOCUMENTS

| 8,449,025 B2 * | 5/2013 | Boersma | B60J 7/0084 296/213 |
| 2013/0015684 A1 * | 1/2013 | Hattori | B60J 7/0084 296/213 |

FOREIGN PATENT DOCUMENTS

| DE | 10 2009 025 122 B4 | 12/2010 |
| DE | 10 2013 020 141 A1 | 6/2015 |

OTHER PUBLICATIONS

Office Action of German Patent Office issued in Application No. 10 2016 213 823.5 dated Apr. 19, 2017 (6 pages).

* cited by examiner

*Primary Examiner* — Dennis H Pedder
(74) *Attorney, Agent, or Firm* — Flynn, Thiel, Boutell & Tanis, P.C.

(57) ABSTRACT

A sliding roof system with a guiding rail profile, including a fastening section with a plurality of mounting domes for connecting the guiding rail profile to a vehicle-fixed roof portion. A water drainage section extending in parallel to the fastening section is provided, which water drainage section is adjoined by a guiding section to guide control kinematics for a movable roof part. The fastening section is provided with integrally formed stiffening reinforcements. The stiffening reinforcements are provided in the vicinity of the mounting domes and extend in the transverse direction of the guiding rail profile continuously into the water drainage section.

7 Claims, 3 Drawing Sheets

SLIDING ROOF SYSTEM OF AN AUTOMOTIVE VEHICLE AND GUIDING RAIL PROFILE THEREFOR

CROSS-REFERENCE TO RELATED APPLICATIONS

This claims priority from German Patent Application No. 10 2016 213 823.5, filed on Jul. 27, 2016, the disclosure of which is hereby incorporated by reference in its entirety.

FIELD OF THE INVENTION

The invention relates to a sliding roof system of an automotive vehicle with a guiding rail profile, including a fastening section with a plurality of mounting domes for connecting the guiding rail profile to a vehicle-fixed roof portion and—as seen in the longitudinal direction of the guiding rail profile—a water drainage section extending in parallel to the fastening section, which water drainage section is adjoined—as seen in the transverse direction of the guiding rail profile—by a guiding section to guide control kinematics for a movable roof part, wherein the fastening section is provided with integrally formed stiffening reinforcements.

The invention also relates to a guiding rail profile for such a sliding roof system.

BACKGROUND OF THE INVENTION

Such a sliding roof system is disclosed in DE 10 2009 025 122 B4. The known sliding roof system includes a guiding rail which is provided with a fastening section by means of which the guiding rail can be connected to a vehicle-fixed roof portion of the automotive vehicle. The guiding section is adjoined—as seen in the vehicle transverse direction—by a water drainage section, with a guiding section adjacent thereto which is for guiding control kinematics for a movable roof part of the sliding roof system. At least one bead is disposed in the fastening section, in order to reinforce the fastening section.

SUMMARY OF THE INVENTION

It is the object of the invention to provide a sliding roof system and a guiding rail profile of the type mentioned at the beginning, which allow improved functionality as compared to the prior art.

This object is achieved for the sliding roof system in that the stiffening reinforcements are provided on the mounting domes and extend in the transverse direction of the guiding rail profile continuously into the water drainage section. As a result, an increased stiffness of the guiding rail profile transversely in relation to the longitudinal direction of the guiding rail profile, in particular on the level of the mounting domes, is obtained. Thereby, an increased stability of a connection between the sliding roof system and the vehicle-fixed roof portion of the vehicle is achievable. The increased stiffness results in improved guiding and running characteristics for control kinematics to displace the movable roof part. The solution according to the invention is particularly advantageous for the use with passenger vehicles. A sliding roof system according to the invention can, however, also be employed with other vehicles on water, in the air, and on land. Employment of the sliding roof system according to the invention is similarly possible with towed vehicles, like in particular trailer caravans or railway carriages.

In an embodiment of the invention, at least one additional outward arcuate feature is formed in the water drainage section as a stiffening reinforcement which is provided in the longitudinal direction offset in relation to the mounting domes. The additional outward arcuate feature is likewise integral to the guiding rail profile and allows further stiffening of the guiding rail profile.

In a further embodiment of the invention, the stiffening reinforcement is designed as an outward embossing feature in the region of at least one mounting dome, which embossing is continuously drawn downwards in a side wall region of the water drainage section. The outward embossing feature is a cold deformation of the guiding rail profile. The guiding rail profile is preferably made of a light metal alloy, and in particular configured as an extruded section profile. As an alternative, the guiding rail profile is made of a planar metal plate by punching/bending techniques. In the latter case, using punching/bending techniques, the at least one outward embossing feature can be produced in one processing step.

In an embodiment of the invention, the outward embossing feature extends starting from the mounting dome across the side wall region into a bottom region of the water drainage section. Thus, the outward embossing feature extends continuously from the mounting dome over an entire height of the side wall region up to the bottom region of the water drainage section.

In a further embodiment of the invention, the at least one outward arcuate feature and the at least one outward embossing feature are shaped upwards relative to an upper side of the guiding rail profile. The shaping towards the upside ensures that residual water cannot remain in the water drainage section. With beads according to the prior art, forming inwards arcuate features extending towards the inside, residual water can remain in said inward arcuate features and cause moisture-related or corrosion-related problems.

In a further embodiment of the invention, the at least one outward embossing feature and/or the at least one outward arcuate feature have a greater material thickness in border areas of greater cross sectional curvature than in transition areas of lesser cross sectional curvature. Said embodiment is practicable by an embossing procedure using an embossing die and a counter punch acting from the opposite direction onto the guiding rail profile. Thereby, the stiffness of the guiding rail profile in the region of the outward embossing feature and/or the outward arcuate feature is further improved.

In a further embodiment of the invention, the outward embossing feature extends across at least one longitudinal edge region of the guiding rail profile. Thereby, an additional stiffening reinforcement of the corresponding longitudinal edge region of the guiding rail profile is achieved.

In a further embodiment of the invention, the outward embossing feature tapers starting from the mounting dome in the direction towards the bottom region of the water drainage section. What is meant by "tapering" is a continuous reduction of the width of the embossing feature over the extension of the embossing feature in the vertical direction of the vehicle. The outward embossing feature grows continuously narrower starting from a wide region on the level of the mounting dome across the side wall region downwards to the bottom region.

For the guiding rail profile the object of the invention is achieved in that the guiding rail profile includes stiffening reinforcements, as described in detail above.

Further advantages and features of the invention will become apparent from the claims and also from the description below of a preferred exemplary embodiment of the invention, illustrated with reference to the drawings.

DETAILED DESCRIPTION

Figure 1:
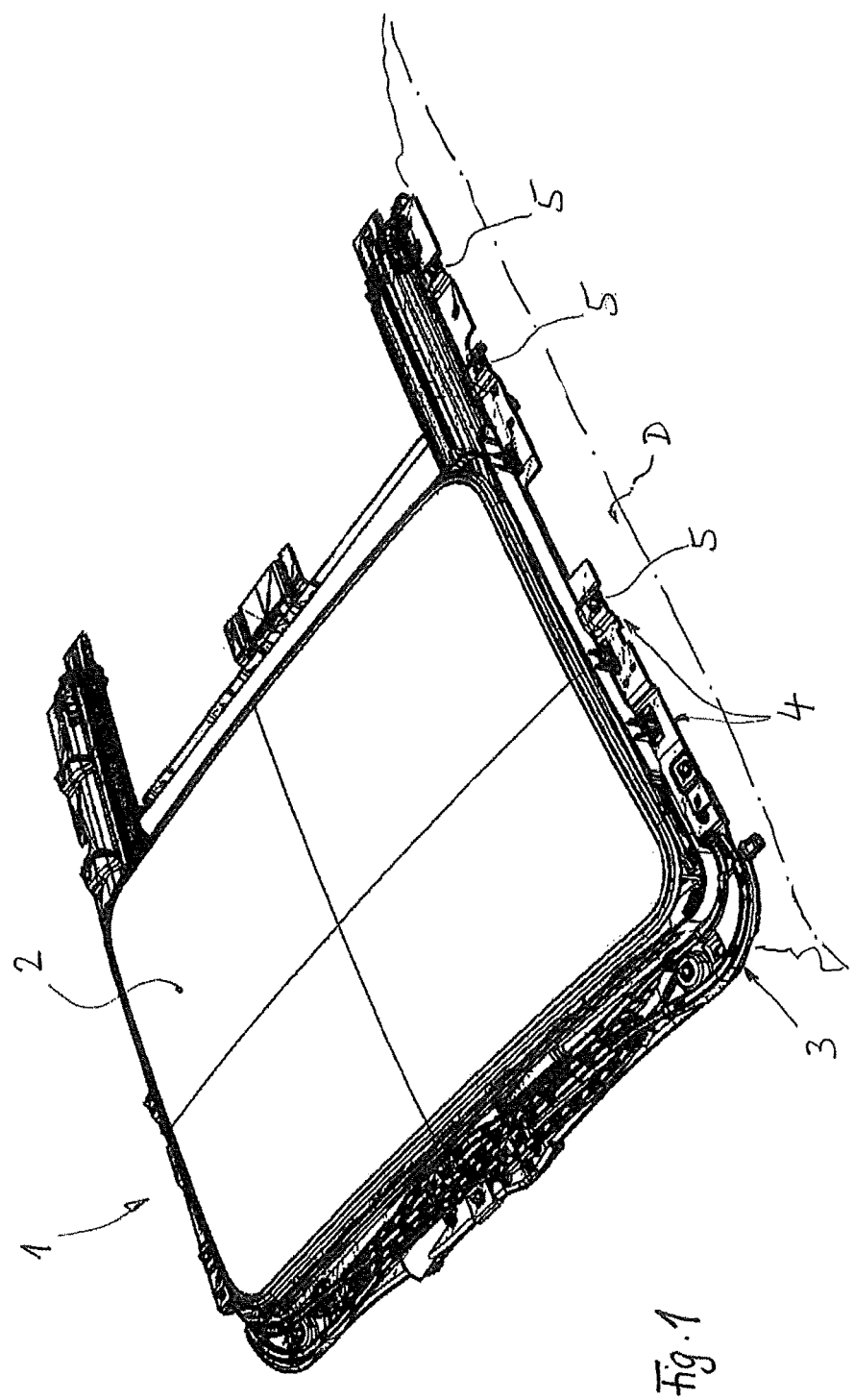
FIG. 1 shows a perspective view of an embodiment of a sliding roof system according to the invention.
Figure 2:
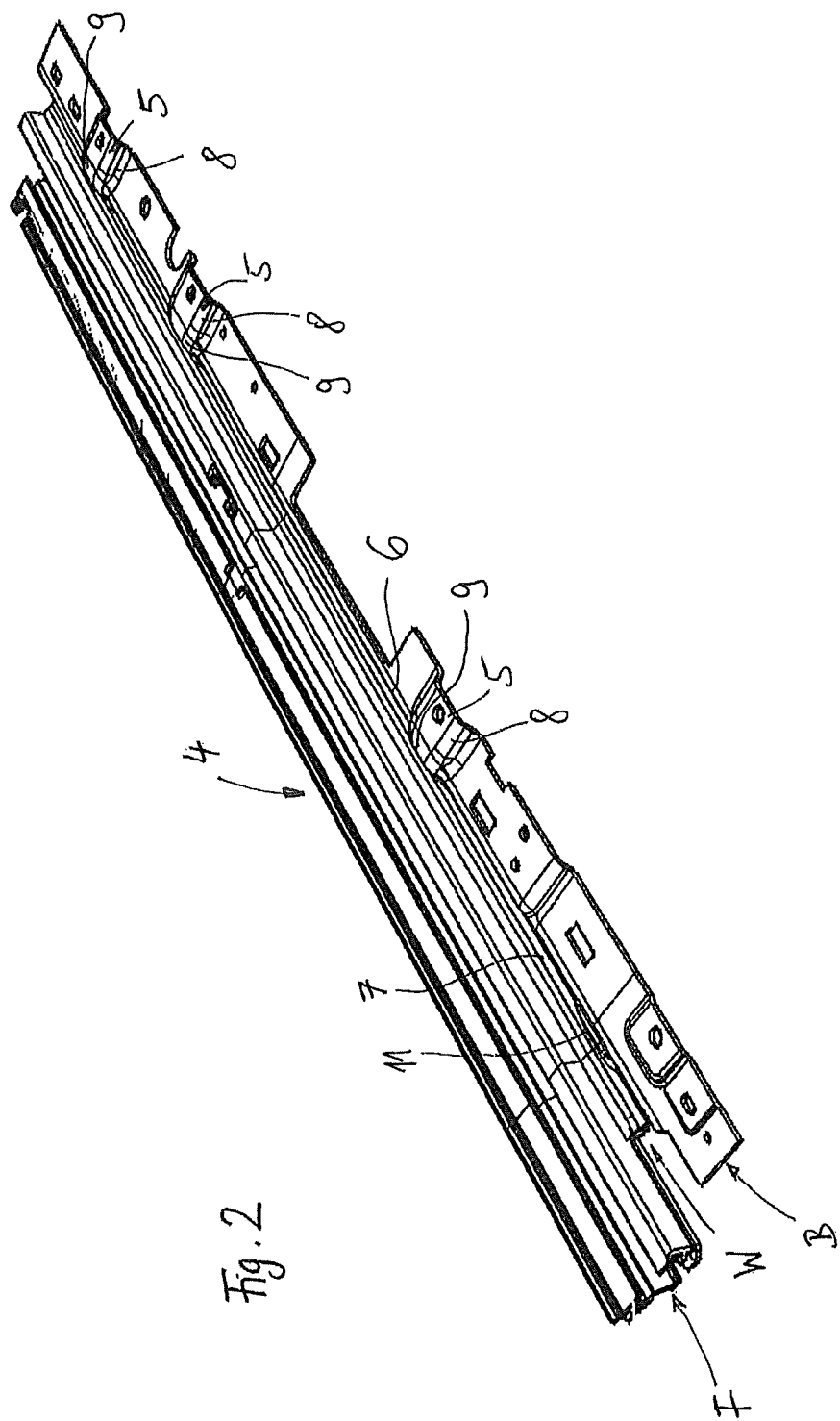
FIG. 2 shows a perspective view of an embodiment of a guiding rail profile according to the invention of the sliding roof system according to FIG. 1.
Figure 3:
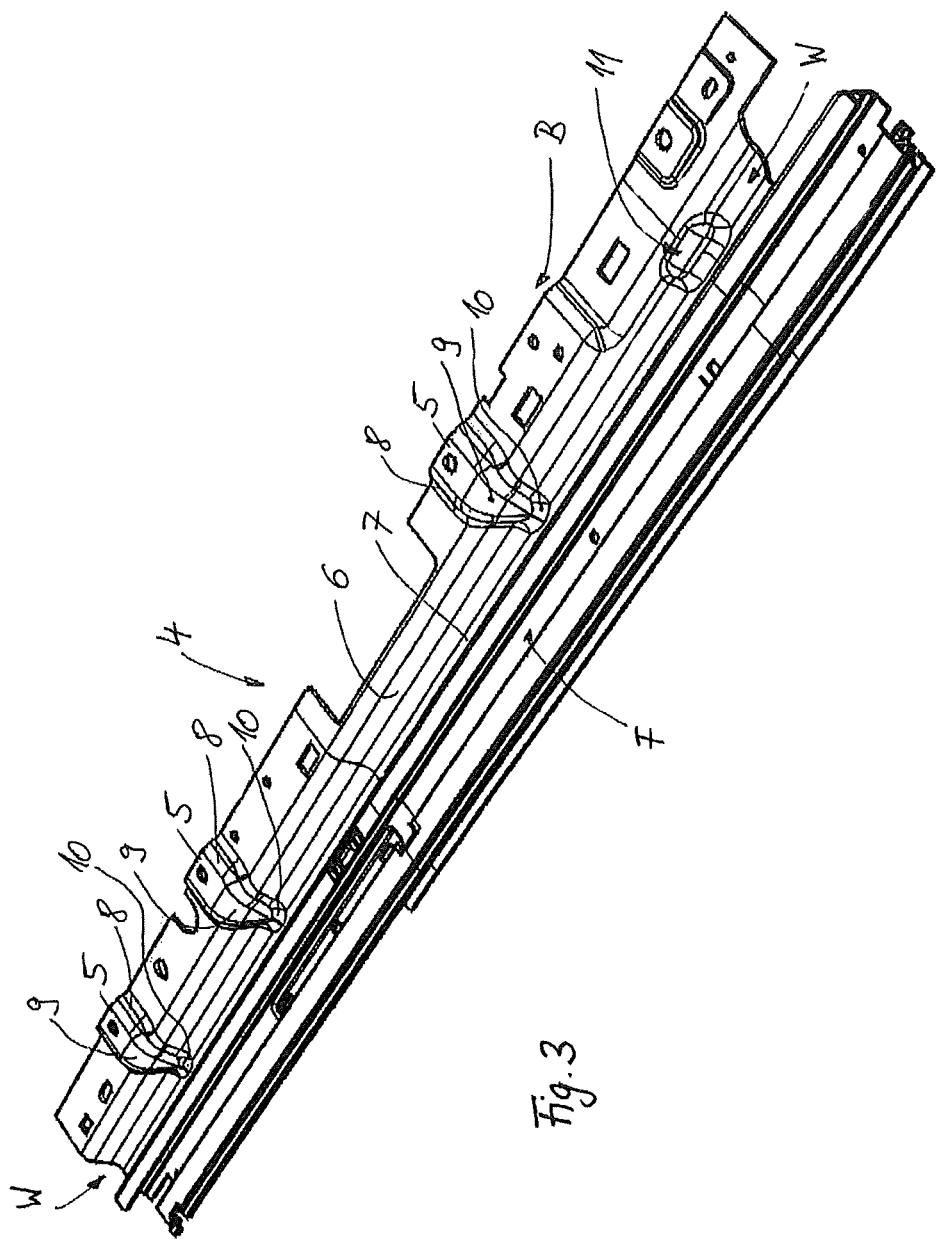
FIG. 3 shows the guiding rail profile according to FIG. 2 in another perspective view.

A passenger vehicle has a roof portion D, as indicated in FIG. 1. Said roof portion D is provided with a roof opening, where a sliding roof system 1 is fitted in. The sliding roof system 1 includes a support frame 3 which is provided with a respective guiding rail profile 4 on each of its longitudinal sides, as seen in the vehicle longitudinal direction. The respective guiding rail profile 4 includes a plurality of mounting domes 5 distributed over the length of the guiding rail profile 4, and using said mounting domes 5 the support frame 3 is firmly connected to the roof portion D. For that purpose, fastening means (not illustrated) in the form of screwed connections, riveted connections, welded connections or adhesive bonding connections are provided. In the embodiment according to FIGS. 1 to 3, screwed connections are provided as fastening means. For that purpose, the mounting domes 5 include corresponding fixing holes, shown with reference to FIGS. 2 and 3, but not illustrated in more detail.

The sliding roof system 1 is provided with a movable roof part 2 which is displaceable using control kinematics (not illustrated in more detail) along the guiding rail profiles 4 between a closed position, a ventilation position and an open position, as illustrated in FIG. 1.

The guiding rail profile 4 on each side of the support frame 3 is respectively produced in the form of a metallic extruded profile made of a light metal alloy, which profile additionally is further processed by cold deformation. In addition, the guiding rail profile 4 is processed by cutting, in order to provide holes, recesses, slots and similar. The guiding rail profile 4 has a guiding section F on a longitudinal side facing the roof part 2, which guiding section is embodied in a hollow profile section, in order to allow guiding of different functional parts of the control kinematics for displacing the roof part 2. The guiding section F is adjoined—in the vehicle transverse direction—towards the outside by a water drainage section W which has a channel shape and includes a bottom region 7 and two side wall regions, from which a side wall region 6 transitions integrally into a fastening section B which extends, in parallel to the water drainage section W, on a longitudinal side of the water drainage section W opposite the guiding section F. The water drainage section W and the fastening section B merge in one piece. The guiding rail profile 4 is designed as a one-piece component, with the guiding section F, the water drainage section W and the fastening section B integrated therein in one piece. In a not illustrated exemplary embodiment of the invention, the guiding section F is produced as a separate extruded hollow profile, and the water drainage section W and the fastening section B are produced separate from the guiding section F as a further sheet metal bended part and, after completion, connected firmly to the guiding section F over an entire length of the guiding section F. After assembly of the sheet metal component composed of water drainage section W and fastening section B to the guiding section F, as a result, the thereby formed guiding rail profile 4 is handleable likewise as a unitary and dimensionally stable component.

The fastening section B includes three mounting domes 5 which are arranged distributed over a length of the fastening section B. The mounting domes 5 are each produced by a dome-shaped outward embossing feature of the fastening section B towards the upside. The outward embossing feature is produced by a dome-type arcuate feature 8 in the region of the upper side of the fastening section B, which proceeds continuously up to the side wall region 6 of the water drainage section W into a trapezoidal bulge 9—as seen in a top view on the side wall region 6—which continues by means of a lower transition area 10 into the bottom region 7 of the water drainage section W and runs out there in a planar bottom surface of the bottom region 7. The bulge 9 tapers in a wedge shape towards the bottom region 7 of the water drainage section W. The outward embossing feature is designed such that a dome-shaped curved and arched transition is obtained between the arcuate feature 8 and the bulge 9. The bulge 9 transitions into the transition area 10 across a concave inward arcuate feature. Details on the configuration of the outward embossing feature in the region of the respective mounting dome 5 are well apparent with reference to FIG. 3. A wall thickness of the guiding rail profile 4 is maintained equal in size, at least largely, across the entire fastening section B and the water drainage section W inclusive the regions of the outward embossing features on the mounting domes 5. It is apparent with reference to FIG. 3 that the outward embossing features 8 to 10 in the region of the mounting domes 5 "flow" in the type of a waterfall starting from an upper side of the fastening section B across the side wall region 6 towards the bottom region 7 of the water drainage section W. Therein, the respective outward embossing feature extends on the one hand across a longitudinal edge region (not illustrated in more detail), which forms an upper border area of the side wall region 6, and on the other hand across a lower longitudinal edge region of the water drainage section W, which forms a transition between the side wall region 6 and the bottom region 7 of the water drainage section W.

In addition, the guiding rail profile 4 also has a further stiffening reinforcement in the form of an outward arcuate feature 11 in the region of the water drainage section W, which arcuate feature is axially offset in the longitudinal direction in relation to the mounting domes 5 and integrally formed in the side wall region 6. The outward arcuate feature 11 extends over almost an entire height of the side wall region 6 and continues across the lower longitudinal edge region up to the bottom region 7 of the water drainage section W. The outward arcuate feature 11 protrudes beyond a surface of the side wall region 6 upwards in a bump shape and towards the guiding section F, wherein transition areas to planar surfaces of the side wall region 6 and the bottom region 7 have a concave curvature, in order to achieve a steady and continuous transition towards the respective planar surface of the bottom region 7 and the side wall region 6.

The invention claimed is:

1. Sliding roof system of an automotive vehicle with a guiding rail profile, including a fastening section with a plurality of mounting domes for connecting the guiding rail profile to a vehicle-fixed roof portion and—as seen in the longitudinal direction of the guiding rail profile—a water drainage section extending in parallel to the fastening section, which water drainage section is adjoined—as seen in the transverse direction of the guiding rail profile—by a guiding section to guide control kinematics for a movable roof part, wherein the fastening section is provided with integrally formed stiffening reinforcements, wherein the stiffening reinforcements are provided on the mounting domes and extend in the transverse direction of the guiding rail profile continuously into the water drainage section.

2. Sliding roof system according to claim 1, wherein at least one additional outward arcuate feature is formed in the water drainage section as a stiffening reinforcement which is provided in the longitudinal direction offset in relation to the mounting domes.

3. Sliding roof system according to claim 1, wherein the stiffening reinforcements are designed as an outward embossing feature in a region of at least one of the mounting domes, which outward embossing feature is continuously drawn downwards in a side wall region of the water drainage section.

4. Sliding roof system according to claim 3, wherein the outward embossing feature extends starting from the at least one of the mounting domes across the side wall region into a bottom region of the water drainage section.

5. Sliding roof system according to claim 1, wherein at least one additional outward arcuate feature is formed in the water drainage section as a stiffening reinforcement which is provided in the longitudinal direction offset in relation to the mounting domes, wherein the stiffening reinforcements are designed as an outward embossing feature in a region of at least one of the mounting domes, which outward embossing feature is continuously drawn downwards in a side wall region of the water drainage section, and wherein the at least one additional outward arcuate feature and the outward embossing feature are shaped upwards relative to an upper side of the guiding rail profile.

6. Sliding roof system according to claim 3, wherein the outward embossing feature extends across at least one longitudinal edge region of the guiding rail, profile.

7. Sliding roof system according to claim 1, wherein the stiffening reinforcements are designed as an outward embossing feature in a region of at least one of the mounting domes, which outward embossing feature is continuously drawn downwards in a side wall region of the water drainage section, wherein the outward embossing feature extends starting from the at least one of the mounting domes across the side wall region into a bottom region of the water drainage section, and wherein the outward embossing feature tapers starting from the at least one of the mounting domes in the direction towards the bottom region of the water drainage section.

* * * * *